(12) United States Patent
Lane (10) Patent No.: US 10,773,940 B2
(45) Date of Patent: Sep. 15, 2020

(54) METHOD OF APPLYING TOP LOAD FORCE

(71) Applicant: Amcor Rigid Packaging USA, LLC, Zurich (CH)

(72) Inventor: Michael T. Lane, Brooklyn, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 43 days.

(21) Appl. No.: 15/764,809

(22) PCT Filed: Dec. 7, 2015

(86) PCT No.: PCT/US2015/064186
§ 371 (c)(1),
(2) Date: Mar. 29, 2018

(87) PCT Pub. No.: WO2017/099703
PCT Pub. Date: Jun. 15, 2017

(65) Prior Publication Data
US 2018/0273367 A1    Sep. 27, 2018

(51) Int. Cl.
*B29C 49/00* (2006.01)
*B29C 49/42* (2006.01)
(Continued)

(52) U.S. Cl.
CPC ............. *B67C 3/22* (2013.01); *B65C 3/08* (2013.01); *B65C 9/06* (2013.01); *B67C 7/00* (2013.01);
(Continued)

(58) Field of Classification Search
CPC ...... B65C 3/08; B65D 21/086; B65D 79/005; B67C 2003/226
(Continued)

(56) References Cited

U.S. PATENT DOCUMENTS

| | | |
|---|---|---|
| 6,595,380 B2 | 7/2003 | Silvers |
| 7,077,279 B2 * | 7/2006 | Melrose ............... B65D 1/0223 |
| | | 215/381 |

(Continued)

FOREIGN PATENT DOCUMENTS

| | | |
|---|---|---|
| EP | 0666222 A1 | 8/1995 |
| FR | 2896232 A1 | 7/2007 |

(Continued)

OTHER PUBLICATIONS

International Search Report and Written Opinion of the International Searching Authority issued in PCT/US2015/064186, dated Mar. 17, 2016; ISA/KR.

(Continued)

*Primary Examiner* — Thanh K Truong
*Assistant Examiner* — Patrick B Fry
(74) *Attorney, Agent, or Firm* — Harness, Dickey & Pierce, P.L.C.

(57) ABSTRACT

A method for manufacturing and filling a container. The method includes blow molding the container from a preform. The container is then hot filled and cooled. After cooling, the container is labeled. A top load force is applied to the container at least one of: before cooling the container; during cooling of the container; after cooling the container and before labeling the container; during labeling of the container; and after labeling the container in order to reverse any dents in the container formed during the method of manufacturing and filling.

25 Claims, 9 Drawing Sheets

(51) Int. Cl.
  *B29K 67/00* (2006.01)
  *B65C 3/08* (2006.01)
  *B65C 9/06* (2006.01)
  *B65D 1/02* (2006.01)
  *B67C 3/22* (2006.01)
  *B67C 7/00* (2006.01)
  *B29L 31/00* (2006.01)

(52) U.S. Cl.
  CPC .......... *B29C 49/00* (2013.01); *B29C 49/4273* (2013.01); *B29K 2067/003* (2013.01); *B29L 2031/7158* (2013.01); *B65D 1/0246* (2013.01); *B65D 1/0276* (2013.01); *B65D 2501/0036* (2013.01); *B67C 2003/226* (2013.01); *B67C 2003/227* (2013.01)

(58) Field of Classification Search
  USPC ............ 53/167, 440, 127; 215/381; 220/666
  See application file for complete search history.

(56) References Cited

U.S. PATENT DOCUMENTS

| | | | |
|---|---|---|---|
| 7,726,106 B2* | 6/2010 | Kelley | .................... B65B 21/12 |
| | | | 53/290 |
| 8,496,130 B2 | 7/2013 | Lane et al. | |
| 8,596,479 B2 | 12/2013 | Simon et al. | |
| 8,870,006 B2 | 10/2014 | Kamineni et al. | |
| 9,422,076 B2 | 8/2016 | Lane et al. | |
| 9,688,427 B2* | 6/2017 | Melrose | ............... B65D 1/0223 |
| 9,731,850 B2* | 8/2017 | Delage | .................... B65B 31/00 |
| 9,828,130 B2* | 11/2017 | Florian | ..................... B65C 3/16 |
| 9,833,938 B2 | 12/2017 | Lane et al. | |
| 2007/0051073 A1* | 3/2007 | Kelley | .................... B65B 21/12 |
| | | | 53/440 |
| 2013/0270214 A1* | 10/2013 | Huels | ................... B65D 1/0276 |
| | | | 215/377 |
| 2013/0283729 A1* | 10/2013 | Outreman | ............... B65B 51/10 |
| | | | 53/127 |
| 2014/0109517 A1 | 4/2014 | Melrose | |
| 2014/0190927 A1* | 7/2014 | Lane | ..................... B65D 1/0284 |
| | | | 215/373 |
| 2015/0075117 A1* | 3/2015 | Florian | ..................... B65C 3/16 |
| | | | 53/436 |
| 2015/0239583 A1* | 8/2015 | Melrose | ............... B65D 1/0223 |
| | | | 53/471 |

FOREIGN PATENT DOCUMENTS

| | | |
|---|---|---|
| WO | WO-2004063092 A1 | 7/2004 |
| WO | 2005085082 A1 | 9/2005 |
| WO | WO-2013177150 A1 | 11/2013 |
| WO | WO-2015069620 A1 | 5/2015 |
| WO | WO-2016028302 A1 | 2/2016 |

OTHER PUBLICATIONS

Supplementary European Search Report issued in corresponding European Patent Application No. 15910330, dated Aug. 5, 2019.

* cited by examiner

| ES27 | 100F | Height Change (in.) | |
|---|---|---|---|
| Topload | 1 | 2 | AVG |
| 0 lbs | 7.718 | 7.710 | 7.714 |
| 150 lbs | 7.702 | 7.687 | 7.695 |
| 200 lbs | 7.685 | 7.673 | 7.679 |
| 0-150 lbs | -0.016 | -0.023 | -0.019 |
| 0-200 lbs | -0.033 | -0.037 | -0.035 |
| volume displaced | | | -3.8 |
| vacuum reduction | | | -21% |

| ES53 | 100F | Height Change (in.) | |
|---|---|---|---|
| Topload | 1 | 2 | AVG |
| 0 lbs | 7.784 | 7.801 | 7.793 |
| 150 lbs | 7.764 | 7.783 | 7.774 |
| 200 lbs | 7.753 | 7.766 | 7.760 |
| 0-150 lbs | -0.020 | -0.018 | -0.019 |
| 0-200 lbs | -0.031 | -0.035 | -0.033 |
| volume displaced | | | -3.6 |
| vacuum reduction | | | -20% |

| ES27 | 70F | Height Change (in.) | |
|---|---|---|---|
| Topload | 1 | 2 | AVG |
| 0 lbs | 7.722 | 7.688 | 7.705 |
| 150 lbs | 7.715 | 7.684 | 7.700 |
| 200 lbs | 7.696 | 7.674 | 7.685 |
| 0-150 lbs | -0.007 | -0.004 | -0.006 |
| 0-200 lbs | -0.026 | -0.014 | -0.020 |
| volume displaced | | | -2.2 |
| vacuum reduction | | | -12% |

| ES53 | 70F | Height Change (in.) | |
|---|---|---|---|
| Topload | 1 | 2 | AVG |
| 0 lbs | 7.759 | 7.736 | 7.748 |
| 150 lbs | 7.751 | 7.727 | 7.739 |
| 200 lbs | 7.732 | 7.719 | 7.726 |
| 0-150 lbs | -0.008 | -0.009 | -0.008 |
| 0-200 lbs | -0.027 | -0.017 | -0.022 |
| volume displaced | | | -2.4 |
| vacuum reduction | | | -13% |

METHOD OF APPLYING TOP LOAD FORCE

CROSS REFERENCE TO RELATED APPLICATIONS

This application is a U.S. National Phase Application under 35 U.S.C. 371 of International Application No. PCT/US2015/064186 filed on Dec. 7, 2015 and published in English as WO 2017/099703 A1 on Jun. 15, 2017. The entire disclosure of the above application is incorporated herein by reference.

FIELD

The present disclosure relates to a method of applying top load force to a container.

BACKGROUND

This section provides background information related to the present disclosure which is not necessarily prior art.

As a result of environmental and other concerns, plastic containers, more specifically polyester and even more specifically polyethylene terephthalate (PET) containers, are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho a$ is the density of pure amorphous PET material (1.333 g/cc); and $\rho c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

While current containers are suitable for their intended use, they are subject to improvement. For example, a container having reduced weight and increased strength would be desirable. A method for "healing" container defects created during manufacturing, such as dents, ovalization, sidewall deflection, etc., would also be desirable.

SUMMARY

This section provides a general summary of the disclosure, and is not a comprehensive disclosure of its full scope or all of its features.

The present teachings provide for a method for manufacturing and filling a container. The method includes blow molding the container from a preform. The container is then hot filled, capped, and cooled. After cooling, the container is labeled. A top load force is applied to the container at least one of: before cooling the container; during cooling of the container; after cooling the container and before labeling the container; during labeling of the container; and after labeling the container in order to reverse any dents in the container formed during the method of manufacturing and filling, and reduce residual vacuum within the container.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
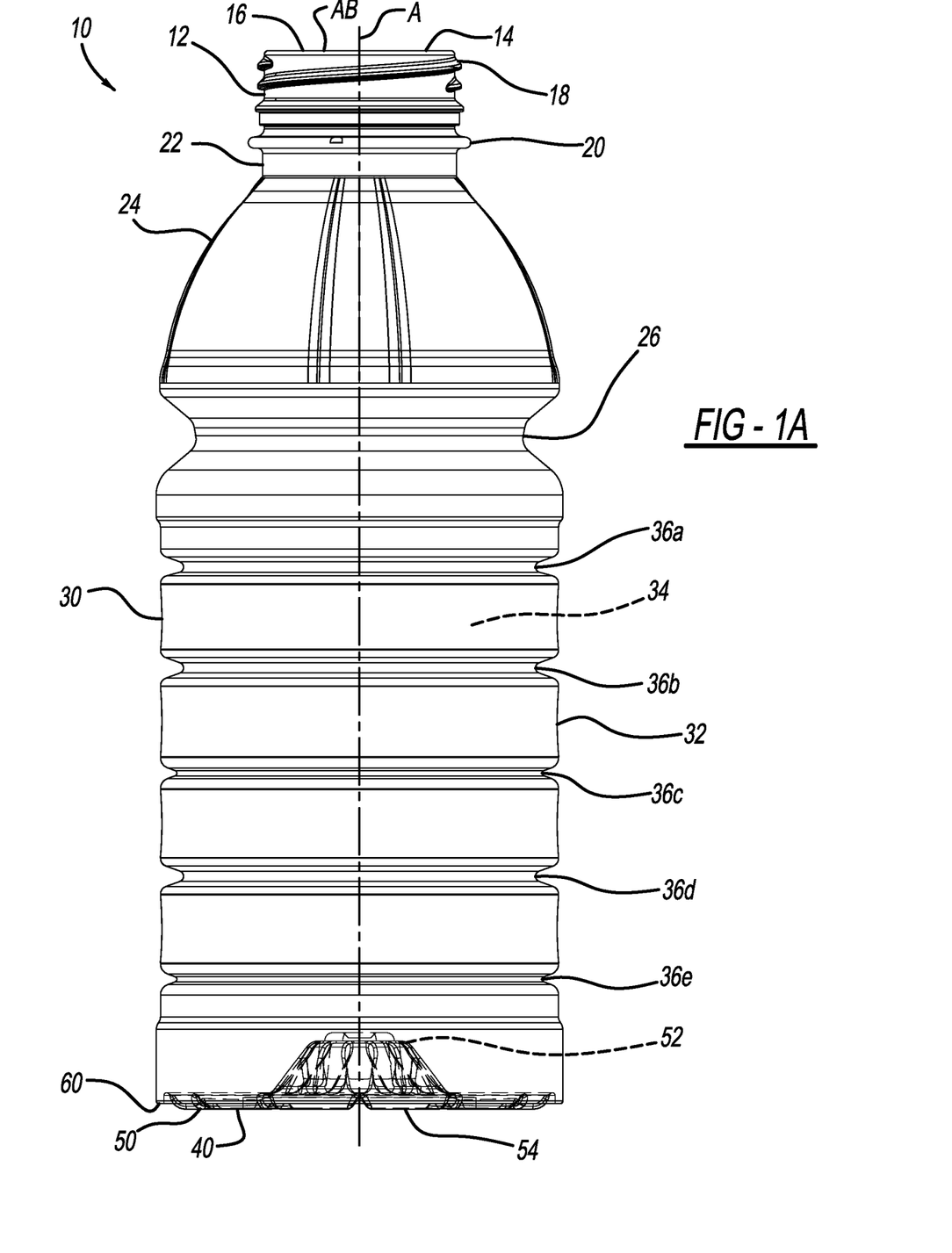
FIG. 1A is a side view of a container manufactured in accordance with the present teachings.
Figure 1B:
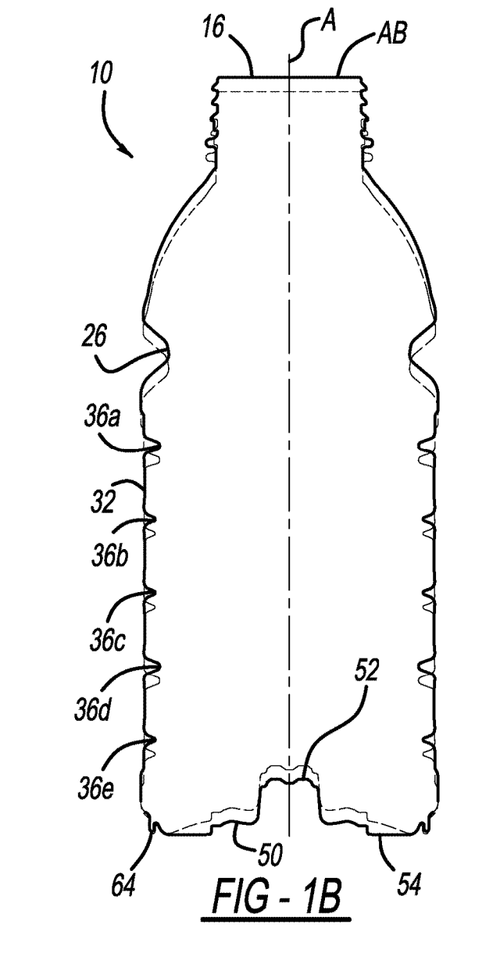
FIG. 1B is a side view of the container of FIG. 1A after the container has been hot-filled and has cooled.
Figure 1C:
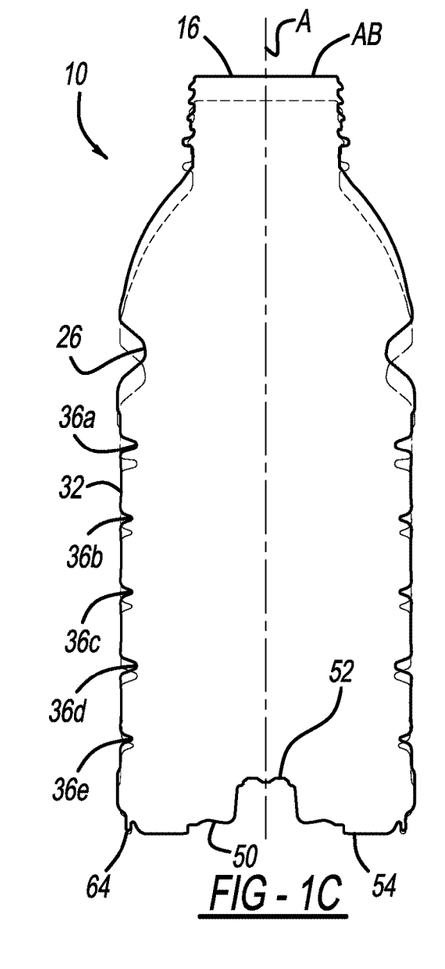
FIG. 1C is a side view of the filled container of FIG. 1B subject to top load force.
Figure 1D:
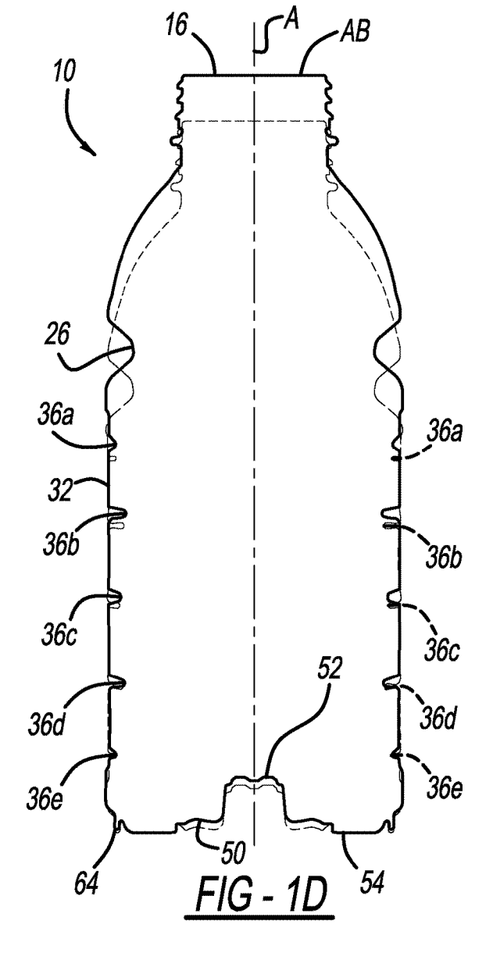
FIG. 1D is a side view of the filled container of FIG. 1C subject to additional top load force.

With initial reference to FIG. 1A, a container according to the present teachings is generally illustrated at reference numeral 10. FIG. 1A illustrates the container 10 in an as-blown, pre-filled configuration. FIG. 1B illustrates the container 10 after being hot-filled and subsequently cooled, with the as-blown position shown at AB. FIG. 1C illustrates the container 10 subject to top load pressure, with the as-blown position shown at AB. FIG. 1D illustrates the container 10 subject to additional top load pressure, with the as-blown position shown at AB.

As illustrated in FIG. 1A, the container 10 can be any suitable container for storing any suitable commodity, such as liquid beverages, food, or other hot-fill type materials. The container 10 can have any suitable shape or size, such as 20 ounces as illustrated. Any suitable material can be used to manufacture the container 10, such as a suitable blow-molded thermoplastic, including PET, LDPE, HDPE, PP, PS, and the like.

The container 10 generally includes a finish 12 defining an opening 14 at a first or upper end 16 of the container 10. The finish 12 includes threads 18 at an outer surface thereof, which are configured to cooperate with a suitable closure for closing the opening 14. In addition to, or in place of, the threads 18, any suitable feature for cooperating with a closure to close the opening 14 can be included. The threads 18 are between the opening 14 and a support ring 20 of the finish 12.

Extending from the support ring 20 on a side thereof opposite to the threads 18 is a neck portion 22. The neck portion 22 extends from the support ring 20 to a shoulder portion 24 of the container 10. The shoulder portion 24 tapers outward from the neck portion 22 in the direction of a main body portion 30. Between the shoulder portion 24 and the main body portion 30 is an inwardly tapered portion 26. The inwardly tapered portion 26 provides the container 10 with a reduced diameter portion, which can be the smallest diameter portion of the container 10 to increase the strength of the container 10.

The main body 30 extends to a second or lower end 40 of the container 10. The second or lower end 40 is at an end of the container 10 opposite to the first or upper end 16. A longitudinal axis A of the container 10 extends through an axial center of the container 10 between the first or upper end 16 and the second or lower end 40.

Figure 2:
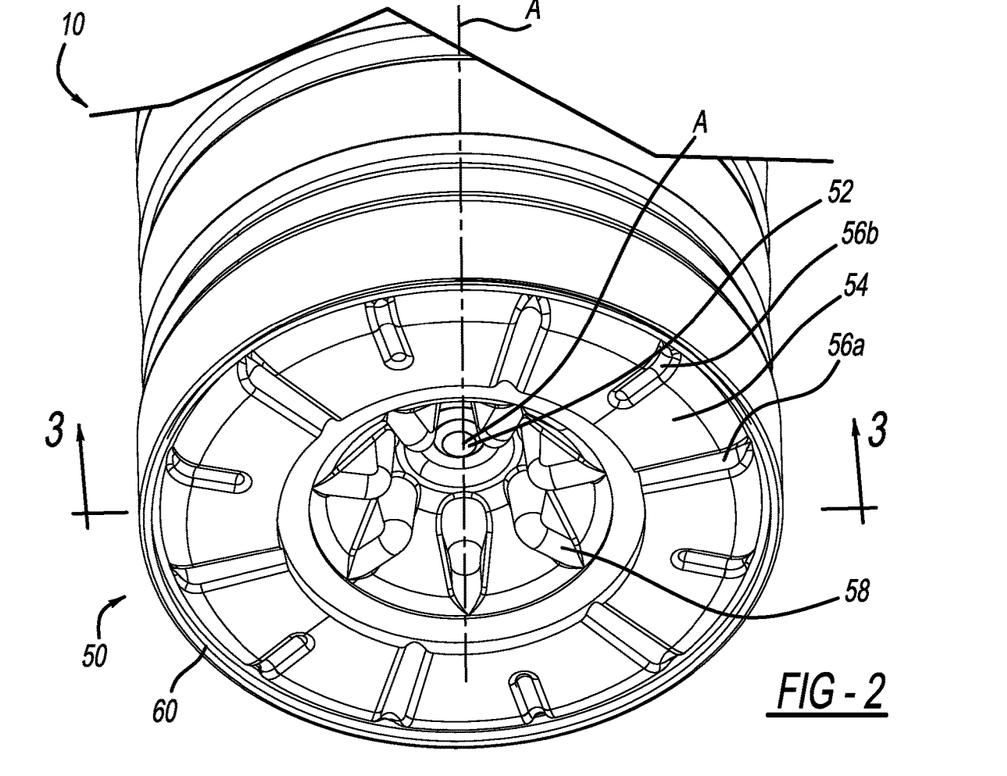
FIG. 2 is a bottom perspective view of the container of FIG. 1.
Figure 3:
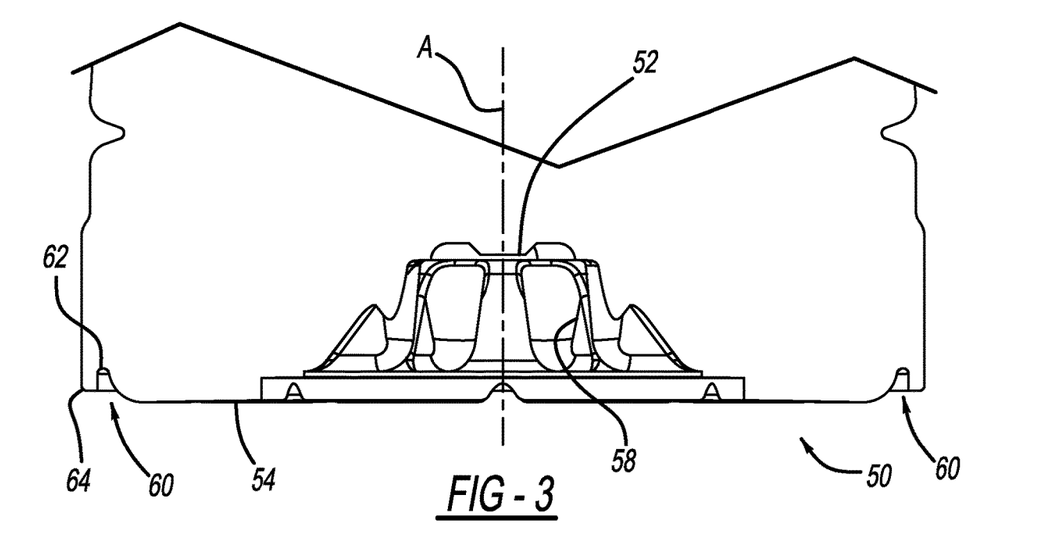
FIG. 3 is a cross-sectional view taken along line 3-3 of FIG. 2.

The main body portion 30 includes a sidewall 32, which extends to a base portion 50 of the container 10 (further illustrated in FIGS. 2 and 3). The sidewall 32 defines an internal volume 34 of the container 10 at an interior surface thereof. The sidewall 32 may be tapered inward towards the longitudinal axis A at one or more areas of the sidewall 32 in order to define recesses or ribs 36 at an exterior surface of the sidewall 32. As illustrated, the sidewall 32 defines five recesses or ribs 36a-36e. However, any suitable number of recesses or ribs 36 can be defined. The ribs 36 can be horizontal as illustrated, or can have any other suitable size or shape. For example, the ribs 36 can curved, as illustrated in U.S. Pat. No. 8,596,479 titled "Hot-Fill Container" (issued on Dec. 3, 2013), the entire disclosure of which is incorporated herein by reference. The present teachings further provide for use of the ribs of U.S. Pat. No. 8,496,130 titled "Hot-Fill Container Having Movable Ribs for Accommodating Vacuum Forces" (issued Jul. 30, 2013), the entire disclosure of which is incorporated herein by reference.

The ribs 36 can have any suitable external diameter, which may vary amongst the different ribs 36 or remain constant. For example and as illustrated, the first recess or rib 36a and the fourth recess or rib 36d can each have a diameter that is less than, and a height that is greater than, the second, third, and fifth recesses or ribs 36b, 36c, and 36e. In response to an internal vacuum, the ribs 36 can articulate about the sidewall 32 to arrive at a vacuum absorbed position, as illustrated in FIG. 1D for example. Thus, the ribs 36 can be vacuum ribs. The ribs 36 can also provide the container 10 with reinforcement features, thereby providing the container 10 with improved structural integrity and stability, which allows the container 10 to be thinner and lighter. The larger ribs 36a and 36d will have a greater vacuum response. Smaller ribs 36b, 36c, and 36e will provide the container with improved structural integrity.

Figure 4:
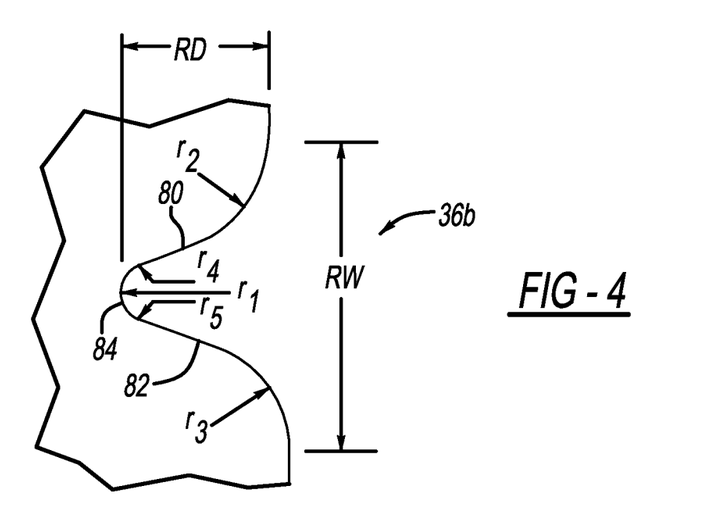
FIG. 4 is an enlarged side view of a rib of the container of FIG. 1.

With reference to FIG. 4, additional details of horizontal rib 36b are illustrated as an example of one possible embodiment. The features of rib 36b illustrated in FIG. 4 also generally apply to ribs 36a and 36c-36e. Horizontal rib 36b includes an upper wall 80 and a lower wall 82 separated by an inner curved wall 84. Inner curved wall 84 is in part defined by a relatively sharp innermost radius r1. Sharp innermost radius r1 can lie within the range of about 0.01 inches to about 0.03 inches. The relatively sharp innermost radius r1 of inner curved wall 84 facilitates improved material flow during blow molding of the plastic container 10, thus enabling formation of relatively deep horizontal ribs 36.

Horizontal rib 36b, as well as the other ribs 36, can include an upper outer radius $r_2$ and a lower outer radius $r_3$. Preferably both the upper outer radius $r_2$ and the lower outer radius $r_3$ each lie within the range of about 0.07 inches to about 0.14 inches. The upper outer radius $r_2$ and the lower outer radius $r_3$ may be equal to each other or differ from one another. Preferably the sum of the upper outer radius $r_2$ and the lower outer radius $r_3$ will be equal to or greater than about 0.14 inches and less than about 0.28 inches.

As illustrated in FIG. 4, horizontal rib 36b (as well as the other horizontal ribs 36a and 36c-36e), further includes an upper inner radius $r_4$ and a lower inner radius $r_5$. The upper inner radius $r_4$ and the lower inner radius $r_5$ each lie within the range of about 0.08 inches to about 0.11 inches. The upper inner radius $r_4$ and the lower inner radius $r_5$ may be equal to each other or different from one another. The sum of the upper inner radius $r_4$ and the lower inner radius $r_5$ can be equal to or greater than about 0.16 inches and less than about 0.22 inches.

Horizontal rib 36*b* can have a rib depth RD of about 0.12 inches and a rib width RW of about 0.22 inches (as can any of the other ribs 36), as measured from the upper extent of the upper outer radius $r_2$ and the lower extent of the lower outer radius $r_3$. As such, horizontal rib 36*b* (as well as the other horizontal ribs 36) has a rib width RW to rib depth RD ratio. The rib width RW to rib depth RD ratio is preferably in the range of about 1.6 to about 2.0.

Horizontal ribs 36 are designed to achieve optimal performance with regard to vacuum absorption, top load strength and dent resistance. Horizontal ribs 36 are designed to compress slightly in a vertical direction to accommodate and absorb vacuum forces resulting from hot-filling, capping and cooling of the container contents. Horizontal ribs 36 are designed to compress further when the filled container is exposed to top load forces in accordance with the present teachings, as described further herein.

Figure 5:
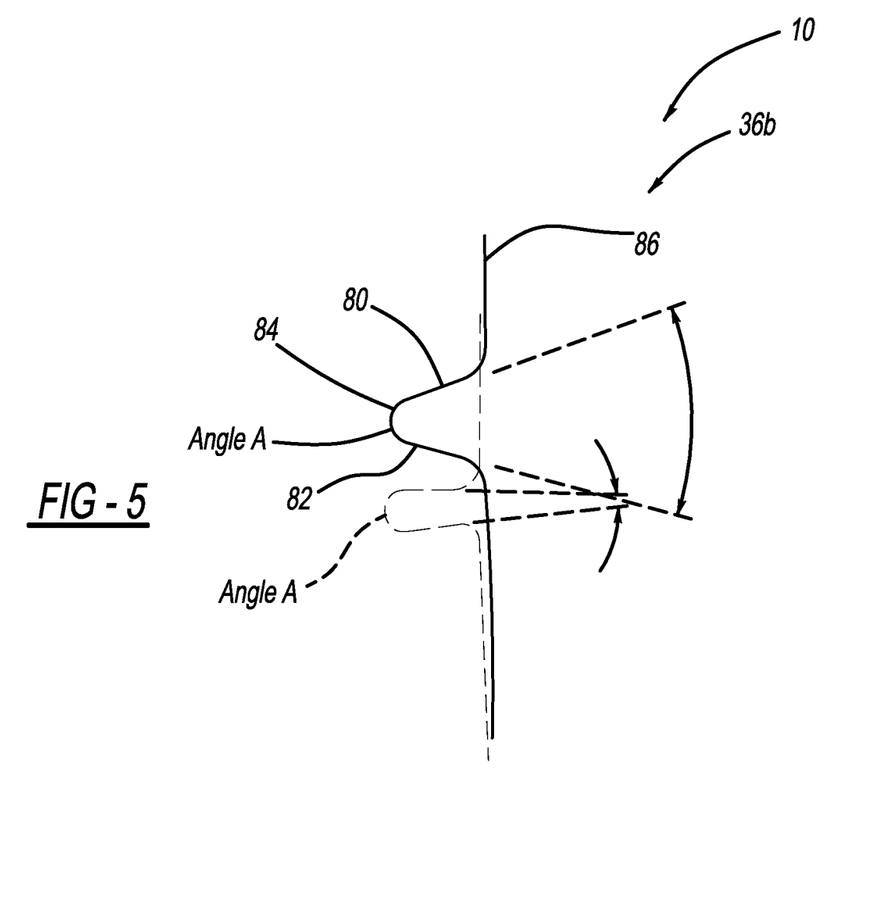
FIG. 5 is an enlarged side view of the rib of FIG. 4 comparing the rib as blown to the rib as compressed after the container of FIG. 1 has been subject to a top load force pursuant to the present teachings.

As illustrated in FIG. 5, the above-described horizontal rib 36*b* radii, walls, depth and width in combination form a rib angle A. The rib angle A of an unfilled plastic container 10 starts at an as-blown angle that may be about 58 degrees. After hot-filling, capping and cooling of the container contents, and applying top load force pursuant to the present teachings (see blocks 130A-130E of FIG. 6 described herein), the rib angle A is reduced.

The horizontal ribs 36 are designed so that the upper wall 80 and the lower wall 82 never come into contact with each other as a result of vacuum or top load forces. Instead horizontal ribs 36 are designed to allow the plastic container 10 to reach a state wherein the plastic container 10 is supported in part by the product inside when exposed to top load forces thereby preventing permanent distortion of the plastic container 10. Horizontal lands 86 are generally flat in vertical cross-section as molded. When the plastic container 10 is subjected to vacuum and/or top load forces, horizontal lands 86 are designed to bulge slightly outward in vertical cross-section to aid the plastic container 10 in absorbing these forces in a uniform way.

With renewed reference to FIGS. 2 and 3, the base portion 50 will now be described in detail. The base portion 50 illustrated and described is an exemplary base portion. The present teachings provide for use of any suitable base portion having any base geometry. For example, any suitable rigid base can be used, such as any suitable non-vacuum absorbing base, or any suitable flexible base can be used, such as a vacuum absorbing base. The base portions set forth in the following documents are examples of base designs that may be used, each one of which is incorporated herein by reference, as is every related application including all parent, continuation, continuation-in-part, and divisional applications, and including all issued patents: U.S. Pub. No. 2014-0190927 titled "Heat-Set Container and Mold System Thereof" (published Jul. 10, 2014); U.S. patent application Ser. No. 14/424,569 titled "Lightweight Container Base" (filed Feb. 27, 2015); International Application No. PCT/US14/52148 titled "Container With Folded Sidewall" (filed Aug. 21, 2014); International Application No. PCT/US14/63812 titled "Hot-Fill Container" (filed Nov. 4, 2014); and U.S. Pat. No. 6,595,380 titled "Container Base Structure Responsive to Vacuum Related Forces" (filed Jul. 19, 2001).

The exemplary base portion 50 illustrated generally includes a central push-up portion 52 at an axial center thereof, through which the longitudinal axis A extends. The central push-up portion 52 can be sized to stack with closures of a neighboring container 10, and also be sized to modify and optimize movement of the base portion 50 under vacuum.

Surrounding the central push-up portion 52 is a diaphragm 54. The diaphragm 54 can include any number of strengthening features defined therein. For example and as illustrated in FIG. 2, a plurality of first outer ribs 56*a* and a plurality of second outer ribs 56*b* can be defined in the diaphragm 54. The first and second outer ribs 56*a* and 56*b* extend radially with respect to the longitudinal axis A. The first outer ribs 56*a* extend entirely across the diaphragm 54. The second outer ribs 56*b* extend across less than an entirety of the diaphragm 54, such as across an outermost portion of the diameter 54. The first and the second outer ribs 56*a* and 56*b* can have any other suitable shape or configuration. Any suitable strengthening feature(s) can be included in the diaphragm 54, such as dimples, triangles, etc. The base portion 50 can further includes a fold 60 at an outer diameter thereof.

In the pre-fill configuration of FIG. 1A, the diaphragm 54 provides a standing surface of the base portion 50 and the overall container 10. Thus the diaphragm 54 is at the second or lower end 40 of the container 10 and the outer folded portion 64 is arranged upward and spaced apart from the second or lower end 40. After the container 10 is filled, such as by way of a hot-fill process, vacuum forces within the container 10 cause the diaphragm 54 to retract and move towards the first or upper end 16 until the diaphragm 54 is generally coplanar with the outer folded portion 64, or closer to the upper end 16 than the outer folded portion 64. Thus in the post-fill configuration of FIG. 1B, the standing surface of the base 50 includes both the diaphragm 54 and the outer folded portion 64, or only the outer folded portion 64.

In the pre-fill configuration of FIG. 1A, the container 10 is supported on the standing surface by the diaphragm 54 of the base portion 50. After hot-filling and capping, the base portion 50 responds to the increase in internal vacuum and reduction of internal volume due to the cooling of the filled contents. As illustrated in FIG. 1B for example, the diaphragm 54 pivots and angles upwards into the container towards the first or upper end 16.

Figure 6:
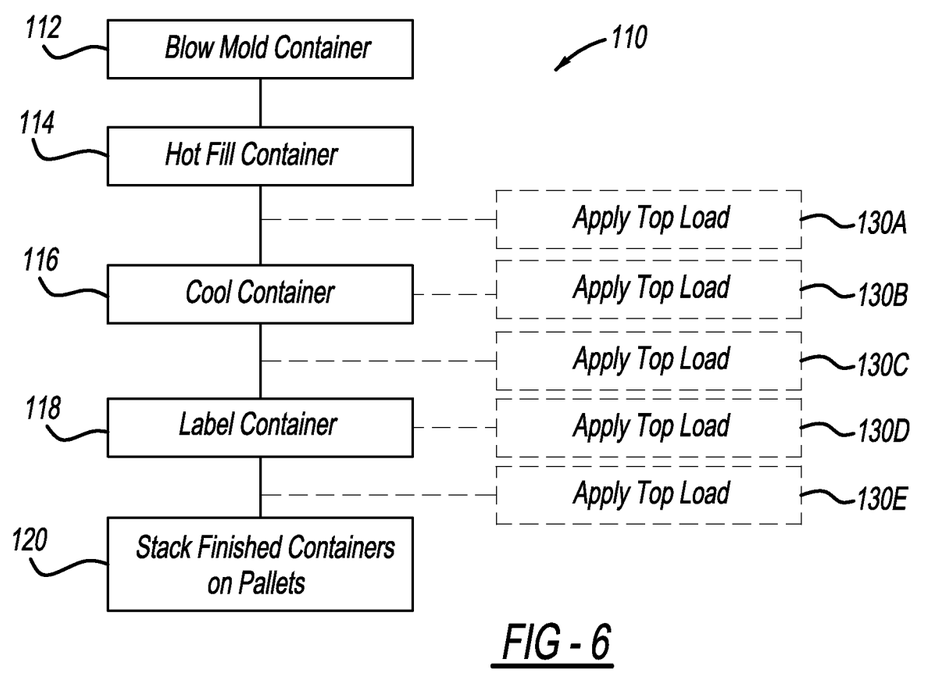
FIG. 6 is a flow-chart illustrating a method according to the present teachings for manufacturing a container and applying top load force.

With reference to FIG. 6, an exemplary method for manufacturing and filling a container pursuant to the present teachings is illustrated. Although the method 110 is described below in terms of the container 10, the method 110 can be used to manufacture and fill any other suitable container according to the present teachings having the following: at least one horizontal compression rib, such as any of the ribs 36 or the ribs disclosed in U.S. Pat. No. 8,496,130; and a base portion having a constrained/rigid base geometry, such as the base portion 50 or the base portions disclosed in U.S. Pub. No. 2014-0190927, U.S. patent application Ser. No. 14/424,569, and International Application No. PCT/US14/52148.

With initial reference to block 112 of FIG. 6, the container 10 is blow molded from a preform to the as-blown configuration of FIG. 1A. After the container 10 is blow molded, the container 10 is hot filled at block 114 using any suitable hot fill, retort, or pasteurization process. The container 10 is capped immediately after being filled. At block 116 the container 10 is cooled in any suitable manner, such as in a cooling tunnel where cold water is sprayed onto the container 10. The container 10 can be transported to the cooling tunnel with a conveyor, for example. With reference to FIG. 1B, as the container 10 cools, the fluid contents therein contract and vacuum is developed within the container 10. This pulls the base portion 50 up towards the upper end 16 due to internal vacuum. The overall height of the container 10 is reduced (compare the container 10 in the as-blown position AB), and the container 10 is supported upright at its outer folded portion 64.

At block 118 the container 10 is transported to any suitable labeling device, which applies a label to the container 10. As the container 10 is hot filled at block 114, cooled at block 116, and labeled at block 118, the container 10 is typically in contact with other containers on a production line, which results in bumping, pushing, vibrating, and other external pressures exerted on the container 10 and surrounding containers. The combination of internal vacuum and external pressure may cause various defects to occur as dents in exterior surfaces of the container 10, such as the sidewall 30 and/or the shoulder 24, and may cause the container 10 to undesirably take on an oval shape.

To invert or "heal" any defects in the container 10, the method 110 includes applying a top load force to the container 10 at one or more of blocks 130A, 130B, 130C, 130D, and/or 130E of FIG. 6. Applying top load force includes applying a force to the container 10 long the longitudinal axis A. The top load force can be applied when the container 10 is standing in the vertical/upright position, as illustrated in FIG. 1A. The top load force may be applied with the container 10 arranged in any other position as well, so long as the top load force is applied along the longitudinal axis A.

Applying top load force increases the pressure within the container 10, causing the container 10 to expand and invert any defects, such as dents, in the surface of the container 10, such as defects that may have occurred during upstream handling. The top load force can be applied at any suitable time during the method of manufacturing and filling 110. For example, the top load force can be applied at block 130A, after the container 10 has been hot filled at block 114 and before the container 10 has been cooled at block 116, such as when contents of the container 10 are still above 100° F. Alternatively, the top load force can be applied at block 130B, during cooling of the container 10 at block 116, such as after contents of the container 10 have been cooled to below 100° F. As another alternative, the top load force can be applied at block 130C, after the container 10 has been cooled at block 116 and before the container is labeled at block 118. The top load force can also be applied at block 130D as the container 10 is being labeled at block 118, such as by any suitable labeling device. The top load force can be applied at block 130E as well, after the container 10 has been labeled. Thus the top load force can be applied at any one or more of blocks 130A, 130B, 130C, 130D, and/or 130E. After the top load force is applied, the container 10 can be stacked on a pallet, along with a plurality of other like containers at block 120.

Any suitable amount of top load force can be applied to compress the container 10 along the longitudinal axis and increase the pressure therein, without permanently damaging the container 10. For example, any suitable amount of top load force between 50 lbs and 200 lbs can be applied, with a preferred top load force of 100 lbs. The top load force can be applied for any suitable amount of time, such as at least 0.01 of a second, which corresponds to a process with high speed cycle times. The top load force can be set, based on the size and shape of the container 10 and the contents therein, to increase the internal pressure of the container 10. There are numerous variables that determine how much top load force is required to obtain the desired effect of expanding surface damage and lowering the internal vacuum, including: the number of horizontal ribs present (such as ribs 36), size of the container 10, weight of the material the container 10 is made of, internal volume of the container 10, wall thickness of the container 10, geometry of the container 10, and temperature of the container 10 and the contents thereof.

The top load force can permanently reduce the height of the container 10 by 0.010" to about 0.060", for example, or by any suitable amount. With reference to FIGS. 1C and 1D, the as-blown position of the container 10 is illustrated at AB, and the height and shape of the container 10 after being subject to top load force is illustrated in phantom. FIG. 1C illustrates initial application of top load force to the container 10 in phantom, and FIG. 1D illustrates the container 10 after the top load force has been applied.

The combination of the vacuum base portion 50 and the horizontal ribs 36 allows the container 10 to reach a state of hydraulic charge up when top load force is applied along longitudinal axis A, thereby "healing" any container defects that may have occurred during the method of manufacturing and filling 110 illustrated in FIG. 6, such as by reversing any dents or deflections, and/or reversing any ovalization. Movement of the base portion 50 caused by top load force is constrained by the standing surface, and the horizontal ribs 36 begin to collapse, thereby causing filled internal fluid to approach an incompressible state. At this point the internal fluid resists further compression and the container 10 behaves similar to a hydraulic cylinder, while maintaining the basic shape of the container 10. Because application of top load force advantageously removes defects that may occur during manufacturing and increases the strength of the container 10, such as by providing the container 10 in a state of hydraulic charge up, the container 10 can be made of thinner materials, thereby making the container 10 advantageously less expensive to manufacture and lighter in weight, which can reduce shipping costs and make the container 10 easier to handle and transport, particularly when numerous containers 10 are provided on one or more pallets.

The top load force results in a reduction of the height of the container 10 because the horizontal ribs 36 partially collapse and do not return to their original dimensions, which further has the effect of lowering residual vacuum within the container 10. This effect becomes more pronounced at higher temperatures. The partial collapse of the ribs 36, as illustrated in FIG. 5 for example, results in a reduction of the height of the container 10. For example, the height of the container 10 can be reduced by 0.010" to 0.060".

Figure 7:
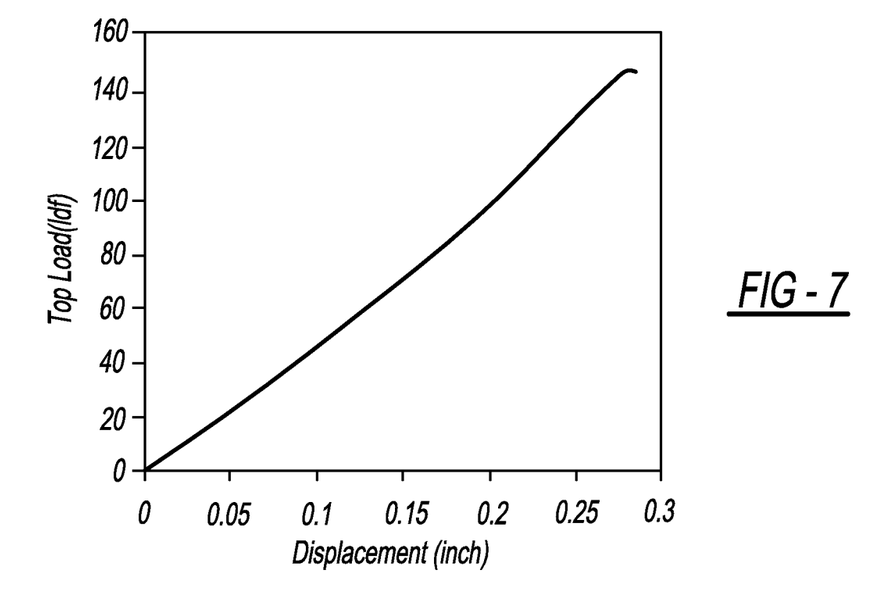
FIG. 7 is a chart illustrating changes in volume of containers subject to top load force during manufacturing in accordance with the present teachings.

FIG. 7 illustrates the relationship between displacement of the container and the amount of top load force applied. As illustrated, the greater the top load force applied, the greater that the displacement of the container 10 will be. For example, at about 20 lbs. of top load force, the displacement of the container 10 is about 0.05 inches. At about 100 lbs. of top load force, the displacement of the container 10 is about 0.1 inches.

Figure 8:
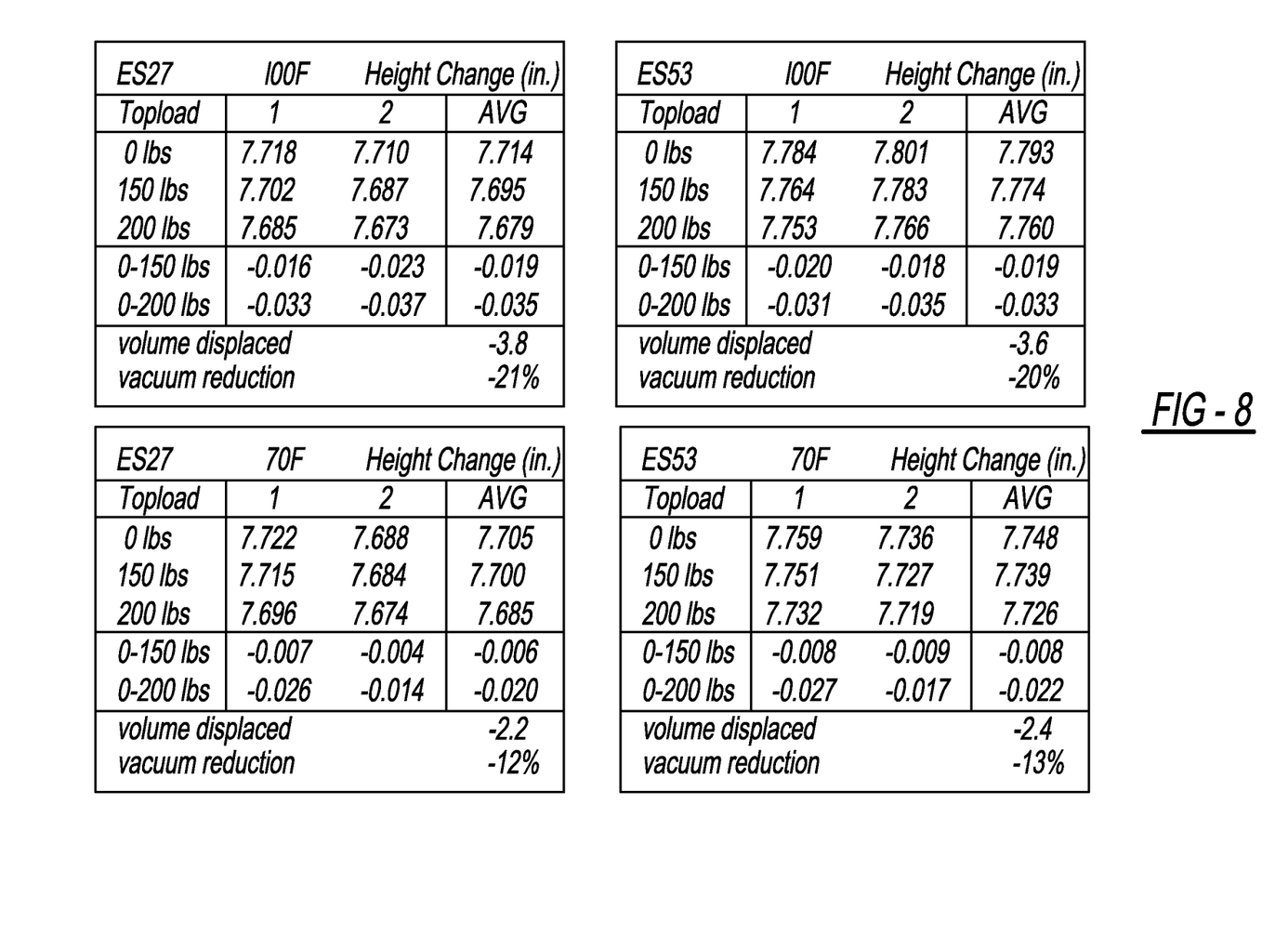
FIG. 8 is a chart illustrating changes in height experienced by containers manufactured in accordance with the present teachings and subject to top load force in accordance with the present teachings.

FIG. 8 sets forth top load test results of containers manufactured and filled in accordance with method 110 of the present teachings. In FIG. 8, the containers are designated ES27 and ES53, provided by Amcor Limited. Two ES27 containers were cooled at block 116 to 100° F., and two ES27 containers were cooled at block 116 to 70° F. Similarly, two ES53 containers were cooled at block 116 to 100° F., and two ES53 containers were cooled at block 116 to 70° F. Each one of the containers was subject to top load forces of 150 lbs and 200 lbs after being cooled. The height change that each one of the containers underwent is set forth in FIG. 8, which shows that the height change of the containers subject to top load after being cooled to 100° F. was greater than the height change of the containers subject to top load after being cooled to 70° F. Accordingly, the containers cooled to 100° F. experienced greater volume displacement and vacuum reduction than the containers cooled to 70° F.

Figure 9:
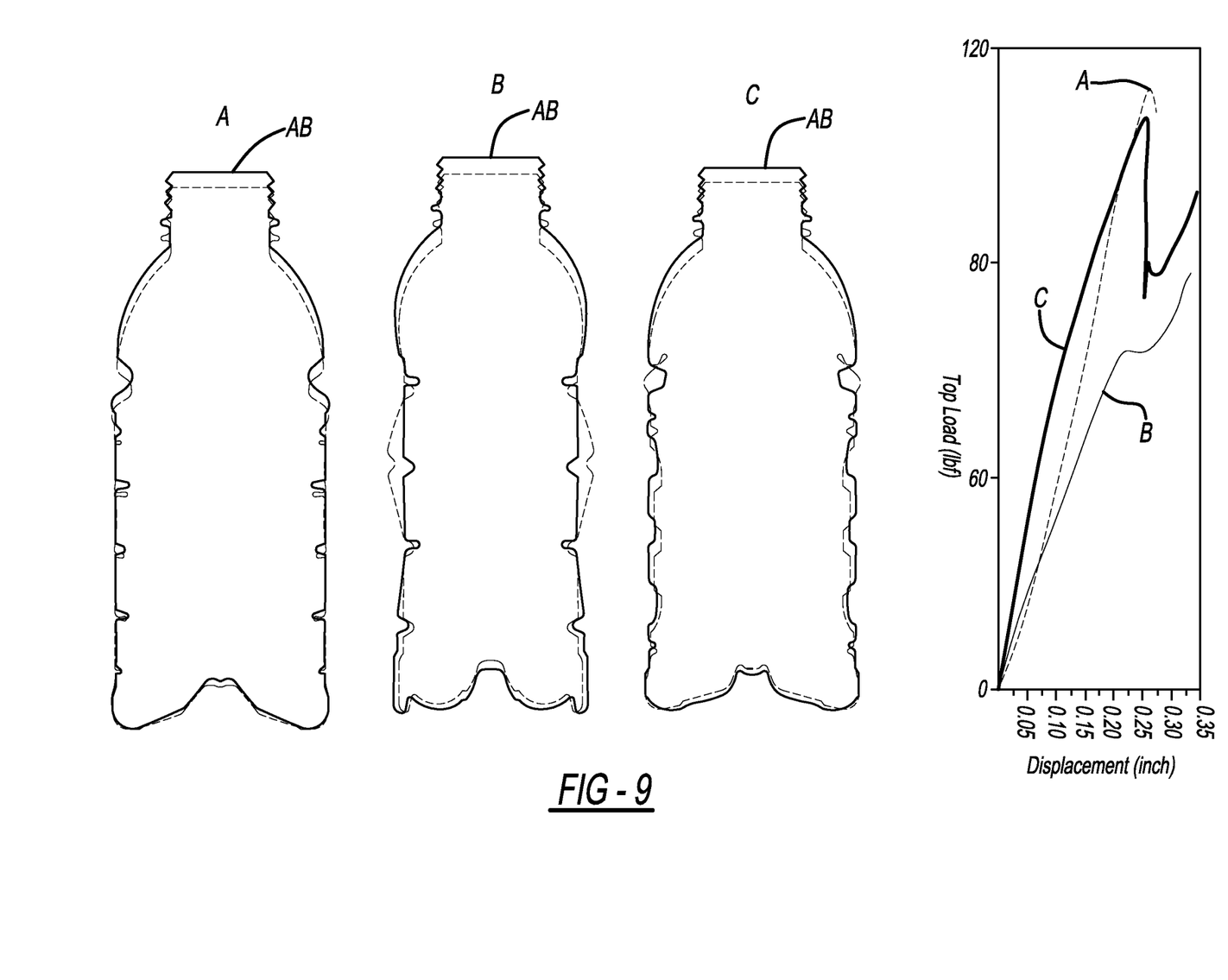
FIG. 9 is a comparison of three different containers subject to top load force.

FIG. 9 illustrates the effect of top load force on three different containers. The as blown configuration of the containers is illustrated in bold lines and designated AB. The configuration of the containers after being subject to top load force is illustrated in phantom. Container A represents a container manufactured in accordance with the present teachings, such as container 10. Thus container A has flexible horizontal ribs and a rigid base portion. Containers B and C also have horizontal ribs, but a flexible base portion. As a result, container A is able to withstand top load force of greater than 100 lbs without the container A failing and/or becoming permanently damaged. As explained above, this advantageously allows container A to withstand greater internal pressure, which will reverse or "heal" indentations caused during the process of manufacturing and filling container A. In contrast, after being subject to about 70 lbs of top load force, the sidewalls of container B will expand outward and become deformed. With respect to container C, at about 100 lbs of top load force the domed shoulder portion of container C will undesirably collapse onto the sidewalls and body portion of the container C.

Figure 10:
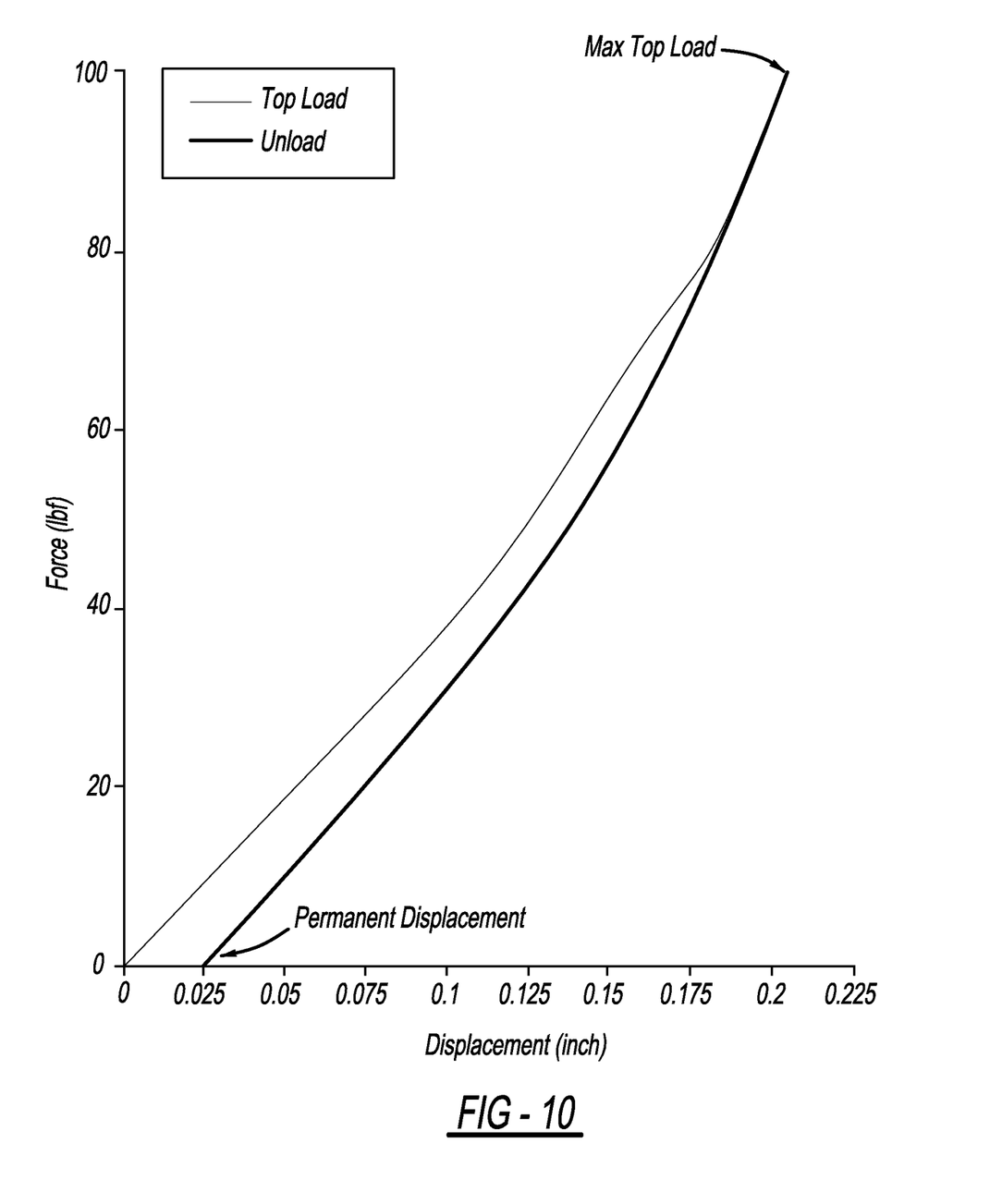
FIG. 10 is a chart illustrating changes in displacement occurring when an exemplary container is subject to top load force in accordance with the present teachings.

FIG. 10 illustrates a relationship between displacement of a container in accordance with the present teachings, such as the container 10, and an amount of top load force applied during manufacturing of the container 10, such as according to the exemplary method 110. As illustrated in FIG. 10, as top load force is applied, the displacement increases until maximum top load force is reached, which in the example of FIG. 10 is at about 100 lbs. However, any other suitable amount of top load force can be applied. As the top load force is unloaded, the displacement decreases, but not all the way to the starting point of zero. Therefore, application of top load force results in permanent displacement, such as of about 0.025 of an inch in the example of FIG. 10. However, the permanent displacement can be any other suitable amount as a result of the top load applied.

Figure 11:
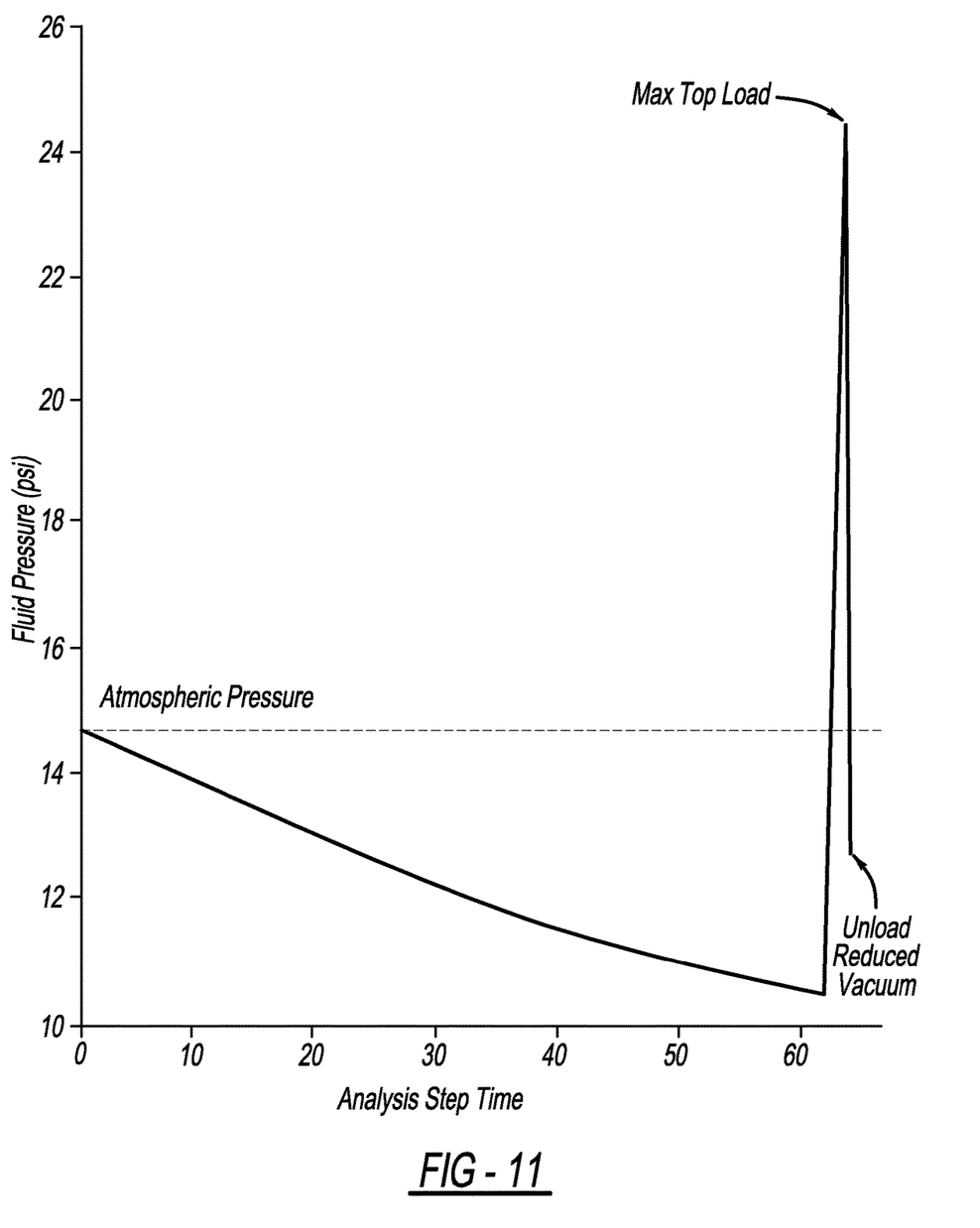
FIG. 11 is a chart illustrating changes in fluid pressure occurring when an exemplary container is subject to top load force in accordance with the present teachings.

FIG. 11 illustrates a relationship between fluid pressure of a container in accordance with the present teachings, such as the container 10, over time during container cooling (such as at block 116 of manufacturing method 110) and application of top load force (such as at any of blocks 130A-130E of method 110). As illustrated in FIG. 11, as the container is cooled, fluid pressure drops from initial atmospheric pressure causing a vacuum in the container until top load is applied. When top load is applied, the fluid pressure rapidly increases to maximum top load. After maximum top load is reached and the top load force is unloaded, the fluid pressure decreases. After the top load force has been completely unloaded, indicated at "Unload Reduced Vacuum" of FIG. 11, the fluid pressure will be below the starting atmospheric pressure, which indicates permanent container reduction in internal volume and reduction in internal vacuum. Furthermore, at "Unload Reduced Vacuum," the final vacuum formed in the container is less than the maximum vacuum realized prior to applying the top load.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for filling a polymeric container comprising:
hot filling the container;
capping the container;
cooling the container after hot filling and capping the container; and
applying a top load force to the container;
wherein upon capping and cooling the container, fluid pressure within the container drops from an initial atmospheric pressure to a maximum pre top load vacuum to create a pre top load vacuum within the container until the top load force is applied, applying the top load force increases the fluid pressure from the maximum pre top load vacuum to above the initial atmospheric pressure to provide a positive fluid pressure within the container until a maximum top load force is applied and the top load force is unloaded, upon unloading the top load force the fluid pressure decreases back below the atmospheric pressure to create a final vacuum in the container that is less than the maximum pre top load vacuum; and
wherein the positive fluid pressure reverses any dents in the container formed during the method of filling.

2. The method of claim 1, further comprising:
labeling the container; and
applying the top load force to the container at least one of before labeling the container, during labeling of the container, and after labeling of the container.

3. The method of claim 1, wherein the container has at least one compression rib.

4. The method of claim 1, further comprising loading the container onto a first pallet, and stacking an additional container on top of the container; and
wherein applying the top load force precharges the container to prepare the container for the additional container to be stacked thereon.

5. The method of claim 1, wherein applying the top load force reduces ovalization of the container.

6. The method of claim 1, wherein the top load force is at least 50 lbs.

7. The method of claim 1, wherein the top load force is between and 200 lbs.

8. The method of claim 1, wherein applying the top load force includes applying force along a longitudinal axis of the container.

9. The method of claim 1, wherein the top load force is applied after contents of the container have cooled below 100° F.

10. The method of claim 1, wherein the top load force is applied before cooling the container and when the contents of the container are at a temperature of 100° F. or greater.

11. The method of claim 1, wherein the container has at least one horizontal compression rib;
wherein applying the top load force compresses the at least one horizontal compression rib; and
wherein subsequent to applying the top load force the at least one horizontal rib remains at least partially compressed thereby reducing the container's overall height.

12. The method of claim 11, wherein applying the top load force reduces the container's overall height by 0.010" to 0.060".

13. The method of claim 1, further comprising blow molding the container to have a rigid base.

14. The method of claim 1, further comprising blow molding the container to have a base that is constrained by a bottom standing surface and is incapable of flexing under top load pressure.

15. The method of claim 1, further comprising applying the top load force to the container for at least 0.1 of a second.

16. A method for filling a polymeric container comprising:
blow molding the container from a preform to provide the container with at least one horizontal compression rib and a base with a constrained geometry;
hot filling the container;
cooling the container;
capping the container;
labeling the container; and
applying a top load force along a longitudinal axis of the container;
wherein upon capping and cooling the container, fluid pressure within the container drops from an initial atmospheric pressure to a maximum pre top load vacuum to create a pre top load vacuum within the container until the top load force is applied, applying the top load force increases the fluid pressure from the maximum pre top load vacuum to above the initial atmospheric pressure to provide a positive fluid pressure within the container until a maximum top load force is applied and the top load force is unloaded, upon unloading the top load force the fluid pressure decreases back below the atmospheric pressure to create a final vacuum in the container that is less than the maximum pre top load vacuum; and
wherein applying the top load force compresses the at least one horizontal compression rib, and provides the positive fluid pressure within the container to invert one or more dents formed on a sidewall of the container.

17. The method of claim 16, wherein applying the top load force reduces ovalization of the container.

18. The method of claim 16, wherein the top load force is at least 50 lbs.

19. The method of claim 16, wherein the top load force is between 50 lbs. and 200 lbs.

20. The method of claim 16, wherein the top load force is applied after contents of the container have cooled below 100° F.

21. The method of claim 16, wherein the top load force is applied before cooling the container and when the contents of the container are at a temperature of 100° F. or greater.

22. The method of claim 16, further comprising blow molding the container to have a base that is constrained by a bottom standing surface and incapable of flexing under top load pressure.

23. The method of claim 16, further comprising applying the top load force to the container for at least 0.1 of a second.

24. A method for filling a container comprising:
blow molding the container from a preform to provide the container with horizontal compression ribs and a base with a constrained geometry;
hot filling the container after blow molding the container;
capping the container after hot filling the container;
cooling the container after capping the container;
labeling the container after cooling the container; and applying a top load force of between 50 lbs. and 200 lbs. for at least 0.1 of a second along a longitudinal axis of the container after cooling the container below 100° F. and before labeling the container to provide a positive fluid pressure within the container and invert one or more dents formed on a sidewall of the container and reduce internal vacuum after the top load is released;

wherein upon capping and cooling the container, fluid pressure within the container drops from an initial atmospheric pressure to a maximum pre top load vacuum to create a pre top load vacuum within the container until the top load force is applied, applying the top load force increases the fluid pressure from the maximum pre top load vacuum to above the initial atmospheric pressure to provide the positive fluid pressure within the container until a maximum top load force is applied and the top load force is unloaded, upon unloading the top load force the fluid pressure decreases back below the atmospheric pressure to create a final vacuum in the container that is less than the maximum pre top load vacuum.

25. The method of claim 24, further comprising loading the container onto a first pallet, and stacking another container on top of the container; and wherein applying the top load force precharges the container to prepare the container for the another container to be stacked thereon.

\* \* \* \* \*